(12) United States Patent
Sauve et al.

(10) Patent No.: US 10,787,974 B2
(45) Date of Patent: Sep. 29, 2020

(54) IGNITION APPARATUS AND METHOD FOR A PREMIXED CHARGE IN A GASEOUS-FUELED ENGINE

(71) Applicant: WESTPORT POWER INC., Vancouver (CA)

(72) Inventors: Kyle D. Sauve, North Vancouver (CA); Sandeep Munshi, Delta (CA); Ning Wu, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/564,921

(22) PCT Filed: Apr. 8, 2016

(86) PCT No.: PCT/CA2016/050407
§ 371 (c)(1),
(2) Date: Oct. 6, 2017

(87) PCT Pub. No.: WO2016/161518
PCT Pub. Date: Oct. 13, 2016

(65) Prior Publication Data
US 2018/0100450 A1    Apr. 12, 2018

Related U.S. Application Data

(60) Provisional application No. 62/145,433, filed on Apr. 9, 2015.

(51) Int. Cl.
*F02D 19/00*    (2006.01)
*F02D 19/10*    (2006.01)
(Continued)

(52) U.S. Cl.
CPC ............ *F02D 19/10* (2013.01); *F02B 17/005* (2013.01); *F02D 19/0689* (2013.01);
(Continued)

(58) Field of Classification Search
CPC .. F02D 19/10; F02D 19/0689; F02D 19/0962; F02D 19/0694; F02D 43/04;
(Continued)

(56) References Cited

U.S. PATENT DOCUMENTS 5,119,780 A * 6/1992 Ariga ................. F02B 17/00
                                                123/300
5,315,973 A * 5/1994 Hill ................. F02B 23/0672
                                                123/27 GE
(Continued)

FOREIGN PATENT DOCUMENTS

DE    11 2011 105 552 T5    5/2014
WO       2013/022630 A1     2/2013

OTHER PUBLICATIONS

International Search Report and Written Opinion of the International Searching Authority, dated May 24, 2016, for International Application No. PCT/CA2016/050407, 9 pages.
(Continued)

*Primary Examiner* — Phutthiwat Wongwian
*Assistant Examiner* — Sherman D Manley
(74) *Attorney, Agent, or Firm* — Seed IP Law Group LLP (57) ABSTRACT

Premixed engines have ignition issues when engine speed and load are below a predetermined range. An ignition apparatus for igniting a premixed charge in a gaseous-fueled internal combustion engine comprises an ignition device associated with a combustion chamber of the internal combustion engine. There is at least one of a dilutant injector for introducing a diluting agent that forms a stratified charge around the ignition device and an enrichment injector for introducing gaseous fuel that forms a stratified charge around the ignition device. An electronic controller is operatively connected with the ignition device and the at least one of the dilutant injector and the enrichment injector and programed to at least one of actuate the dilutant injector to
(Continued)

introduce the diluting agent when the ignition device decreases a local air-fuel equivalence ratio around the ignition device below a predetermined threshold; and actuate the enrichment injector to introduce the gaseous fuel to decrease the local air-fuel equivalence ratio when engine load and engine speed are below a predetermined threshold engine load and speed range and when the ignition device does not affect the local air-fuel equivalence around the ignition device.

20 Claims, 5 Drawing Sheets

(51) Int. Cl.
<br>*F02B 17/00* (2006.01)
<br>*F02D 19/06* (2006.01)
<br>*F02D 41/40* (2006.01)
<br>*F02D 35/02* (2006.01)
<br>*F02D 41/00* (2006.01)
<br>*F02D 41/30* (2006.01)
<br>*F02M 43/04* (2006.01)
<br>*F02D 43/04* (2006.01)
<br>*F02P 23/04* (2006.01)
<br>*F02P 3/01* (2006.01)
<br>*F02P 15/00* (2006.01)
<br>*F02P 13/00* (2006.01)

(52) U.S. Cl.
<br>CPC ..... *F02D 19/0692* (2013.01); *F02D 19/0694* (2013.01); *F02D 35/025* (2013.01); *F02D 41/0025* (2013.01); *F02D 41/0027* (2013.01); *F02D 41/3041* (2013.01); *F02D 41/403* (2013.01); *F02D 43/04* (2013.01); *F02M 43/04* (2013.01); *F02D 41/3047* (2013.01); *F02D 41/3094* (2013.01); *F02P 3/01* (2013.01); *F02P 13/00* (2013.01); *F02P 15/006* (2013.01); *F02P 23/04* (2013.01); *F02P 23/045* (2013.01); *Y02T 10/128* (2013.01); *Y02T 10/36* (2013.01)

(58) Field of Classification Search
<br>CPC ............... F02D 35/025; F02D 41/0025; F02D 41/0027; F02D 41/403; F02D 41/3041; F02D 41/3047; F02D 41/3094; F02M 43/04; F02B 17/005; F02P 23/04; F02P 23/045; F02P 3/01; F02P 13/00; F02P 15/006; Y02T 10/36; Y02T 10/128; Y02T 10/44
<br>See application file for complete search history.

(56) References Cited

U.S. PATENT DOCUMENTS

| | | | | | |
|---|---|---|---|---|---|
| 5,365,902 | A * | 11/1994 | Hsu | .......... | F02B 7/02 123/299 |
| 5,996,558 | A * | 12/1999 | Ouellette | .......... | F02D 19/10 123/27 GE |
| 6,067,954 | A * | 5/2000 | Kudou | .......... | F02D 41/10 123/299 |
| 6,073,862 | A * | 6/2000 | Touchette | .......... | F02D 19/10 239/408 |
| 6,336,598 | B1 * | 1/2002 | Touchette | .......... | F02D 19/10 239/408 |
| 6,557,532 | B1 * | 5/2003 | Nakayama | .......... | F02B 17/005 123/299 |
| 6,659,071 | B2 * | 12/2003 | LaPointe | .......... | F02B 1/04 123/295 |
| 6,912,992 | B2 * | 7/2005 | Ancimer | .......... | F02B 1/12 123/299 |
| 7,117,830 | B1 * | 10/2006 | Boyer | .......... | F02D 13/0219 123/90.15 |
| 7,162,994 | B2 * | 1/2007 | Li | .......... | F02B 7/06 123/295 |
| 7,281,515 | B2 * | 10/2007 | Mann | .......... | F02B 19/10 123/260 |
| 7,681,550 | B2 * | 3/2010 | Kobayashi | .......... | F02B 11/00 123/299 |
| 8,272,368 | B2 * | 9/2012 | Wickstone | .......... | F02D 19/08 123/468 |
| 8,469,009 | B2 * | 6/2013 | Munshi | .......... | C10L 3/06 123/525 |
| 9,334,813 | B2 * | 5/2016 | Fiveland | .......... | F02D 19/0626 |
| 2002/0078918 | A1 * | 6/2002 | Ancimer | .......... | F02B 1/12 123/295 |
| 2002/0166515 | A1 * | 11/2002 | Ancimer | .......... | F02B 1/12 123/27 R |
| 2003/0024246 | A1 * | 2/2003 | Beck | .......... | F02B 1/12 60/599 |
| 2004/0211388 | A1 * | 10/2004 | Hiraya | .......... | F02B 17/005 123/276 |
| 2006/0180121 | A1 * | 8/2006 | Wickman | .......... | F02D 19/081 123/299 |
| 2007/0062470 | A1 * | 3/2007 | Ashizawa | .......... | F02B 23/101 123/90.15 |
| 2007/0235004 | A1 * | 10/2007 | Yi | .......... | F02B 17/005 123/298 |
| 2008/0178836 | A1 * | 7/2008 | Yamashita | .......... | F02B 17/00 123/295 |
| 2009/0120385 | A1 * | 5/2009 | Munshi | .......... | C10L 3/06 123/3 |
| 2012/0325180 | A1 * | 12/2012 | Montgomery | .......... | F02D 41/3094 123/299 |
| 2014/0076291 | A1 * | 3/2014 | Wong | .......... | F02D 19/0647 D19/647 |
| 2014/0238350 | A1 * | 8/2014 | Fiveland | .......... | F02M 69/04 123/445 |
| 2014/0311444 | A1 * | 10/2014 | Coldren | .......... | F02D 41/3836 123/304 |
| 2015/0308362 | A1 * | 10/2015 | Dunn | .......... | F02D 41/3094 123/300 |
| 2016/0010569 | A1 * | 1/2016 | Dunn | .......... | F02D 41/008 123/304 |

OTHER PUBLICATIONS

European Search Report dated Nov. 21, 2018 for European Application No. 16775986.9, 10 pages.

* cited by examiner

IGNITION APPARATUS AND METHOD FOR A PREMIXED CHARGE IN A GASEOUS-FUELED ENGINE

FIELD OF THE INVENTION

The present application relates to an ignition apparatus and method for a premixed charge in a gaseous fueled internal combustion engine.

BACKGROUND OF THE INVENTION

Liquid-fueled internal combustion engines that operate with a stoichiometric air-fuel ratio are known to employ a spark plug for igniting a premixed charge in the combustion chamber. When these engines are fueled with a gaseous fuel it is advantageous to employ a pilot fuel to ignite the gaseous fuel instead of a spark plug because typical gaseous fuels have higher activation energies than liquid fuels, and require higher temperatures to ignite. In known systems, the pilot fuel is directly injected and compression ignited, and the combustion of the pilot fuel acts as a high energy ignition source for the gaseous fuel. Pilot fuels are commonly employed in Diesel-cycle gaseous fuel engines that operate with a globally lean air-fuel mixture. In stoichiometric engines, the local air-fuel equivalence ratio ($\lambda$) around the directly injected pilot fuel is lower (rich) compared to the equivalence ratio around the pilot fuel in the globally lean Diesel-cycle engine. The likelihood of a pilot fuel particle (that is, the molecules from the various constituents of diesel fuel) reacting with an oxidant particle (such as an oxygen molecule) is reduced in the stoichiometric engine. Under lower load conditions, where throttling reduces the number of moles of oxidant in the combustion chamber, there can be difficulties in igniting the pilot fuel since the local air-fuel equivalence ratio around the pilot fuel is decreased compared to higher load conditions, and the likelihood of reacting pilot fuel and oxidant particles is even further reduced. Additionally, at lower load conditions the in-cylinder temperature after compression is lower compared to higher loads, which reduces the reactivity and ignitability of the premixed charge. This problem is exacerbated at low temperature conditions where the kinetic energy associated with the particles in the combustion chamber is reduced and the likelihood of the various particles colliding and reacting due to kinetic motion is hindered.

The same problem with igniting a premixed charge in a gaseous-fueled internal combustion engine at low load or low temperature conditions is also present for engines that do not use a pilot fuel for ignition. For example, when an ignition device for generating a spark, hot surface, laser, microwave, or plasma is employed, then with conventional stoichiometric gaseous fueled engines the local conditions near the ignition device can result in unstable ignition and poor combustion.

The state of the art is lacking in apparatus and techniques for igniting a premixed charge in a stoichiometric gaseous fueled engine, particularly at low load and low temperature operating conditions. The present apparatus and method provide a technique for improving the ignitability of gaseous fuel in a premixed, stoichiometric gaseous-fueled internal combustion engine.

SUMMARY OF THE INVENTION

An improved ignition apparatus for igniting a premixed charge in a gaseous fueled internal combustion engine comprises an ignition device associated with a combustion chamber of the internal combustion engine. There is at least one of a dilutant injector for introducing a diluting agent that forms a stratified charge around the ignition device and an enrichment injector for introducing gaseous fuel that forms a stratified charge around the ignition device. An electronic controller is operatively connected with the ignition device and the at least one of the dilutant injector and the enrichment injector and programed to at least one of actuate the dilutant injector to introduce the diluting agent when the ignition device decreases a local air-fuel equivalence ratio around the ignition device below a predetermined threshold; and actuate the enrichment injector to introduce the gaseous fuel to decrease the local air-fuel equivalence ratio when engine load and engine speed are below a predetermined threshold engine load and speed range and when the ignition device does not affect the local air-fuel equivalence around the ignition device. The gaseous fuel can be at least one of hydrogen, methane, natural gas, propane and mixtures of these fuels.

The ignition device can be, for example, a pilot fuel injector, a spark ignition device, a microwave ignition device, a laser ignition device, a plasma ignition device, a high frequency ignition device and a corona ignition device. The pilot fuel injector is configured to directly introduce a pilot fuel into the combustion chamber. The diluting agent can comprise at least one of an oxidizing agent and a non-reactive substance, and in an exemplary embodiment the diluting agent is air. The diluting agent increases the local air-fuel equivalence ratio around the ignition device. The dilutant injector can be configured to directly introduce the diluting agent into the combustion chamber, and can be part of a combined dilutant and pilot fuel injector.

The electronic controller can be further programmed to actuate the enrichment injector to inject all the gaseous fuel that is burned in the combustion chamber. Alternatively or additionally, the electronic controller can be further programmed actuate the enrichment injector to inject at least a portion of the gaseous fuel to form the premixed charge. The enrichment injector is configured to directly introduce the gaseous fuel into the combustion chamber, and can be part of a combined enrichment and dilutant injector.

An improved ignition apparatus for igniting a premixed charge in a gaseous-fueled internal combustion engine comprises an ignition device associated with a combustion chamber of the internal combustion engine. There is at least one of a dilutant injector for introducing a diluting agent that forms a stratified charge around the ignition device and an enrichment injector for introducing gaseous fuel that forms a stratified charge around the ignition device. An electronic controller is operatively connected with the ignition device and the at least one of the dilutant injector and the enrichment injector and programed to at least one of actuate the dilutant injector and the enrichment injector when a temperature in the combustion chamber is below a predetermined threshold when the ignition device is actuated. The dilutant injector is actuated when the ignition device decreases a local air-fuel equivalence ratio around the ignition device below a predetermined threshold, and the enrichment injector is actuated when the ignition device does not affect the local air-fuel equivalence around the ignition device.

An improved method for igniting a premixed charge in a gaseous-fueled internal combustion engine comprises monitoring engine load and engine speed. When engine load and engine speed are below a predetermined threshold engine load and speed range, diluting the premixed charge near to an ignition device when the ignition device decreases the local air-fuel equivalence ratio around the ignition device below a predetermined threshold; and enriching the premixed charge near the ignition device to decrease the local air-fuel equivalence ratio when the local air-fuel equivalence ratio remains substantially stoichiometric around the ignition device.

The method can further comprise other steps including (but not limited to) monitoring a temperature in the combustion chamber and performing the steps of diluting and enriching when the temperature in the combustion chamber is below a predetermined value. Additionally, the steps can include burning all the gaseous fuel in the combustion chamber in a diffusion combustion mode when the engine load and engine speed are below the predetermined threshold engine load and speed range. It is possible that the premixed charge is simultaneously diluted and enriched around the ignition device to improve the ignitability of the premixed charge.

DETAILED DESCRIPTION OF PREFERRED EMBODIMENT(S)

Figure 1:
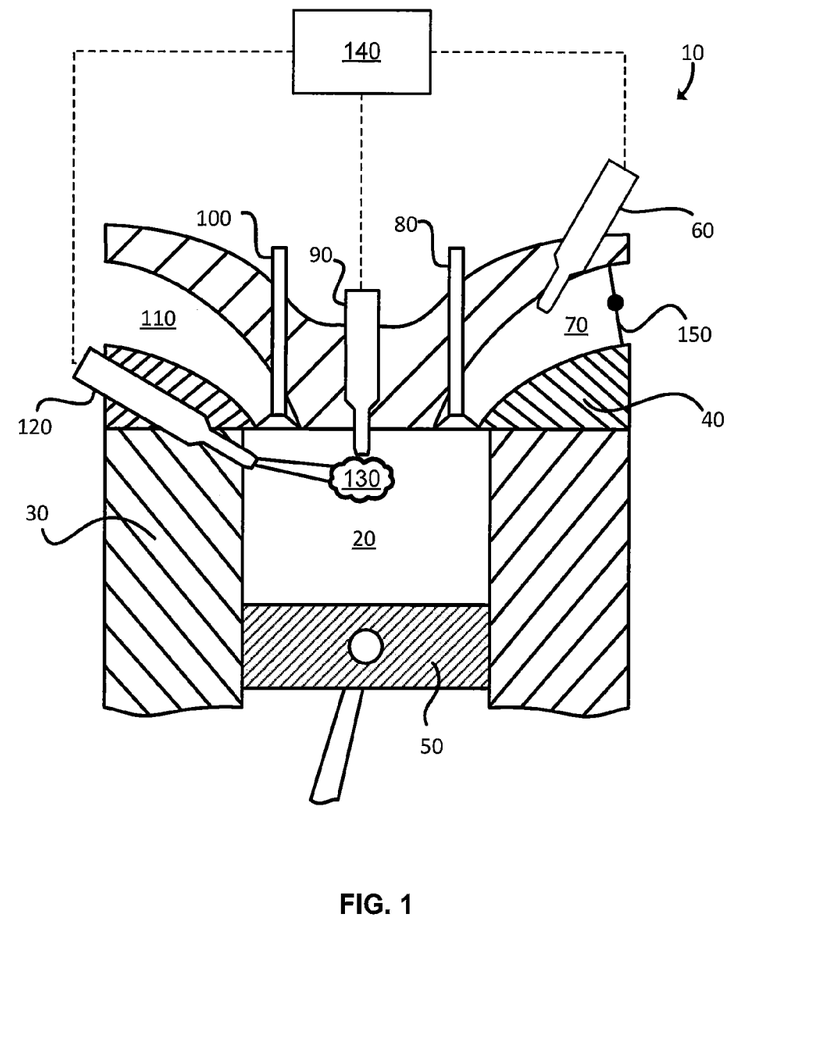
FIG. 1 is a schematic view of an ignition apparatus for a premixed gaseous fuel internal combustion engine according to a first embodiment.

Referring to FIG. 1, there is shown an ignition apparatus for internal combustion engine 10 according to a first embodiment for igniting a premixed charge in combustion chamber 20. The premixed charge is a mixture of air and a gaseous fuel. A gaseous fuel is defined herein to be a fuel that is in the gas state at standard temperature and pressure, which in the context of this application is defined to be twenty degrees Celsius (° C.) and one atmosphere (atm) respectively. Examples of gaseous fuels include biogas, butane, ethane, hydrogen, landfill gas, methane, natural gas, propane and mixtures of these fuels. Combustion chamber 20 in this example is defined by cylinder block 30, cylinder head 40 and piston 50. Only one such cylinder is shown in FIG. 1, although as would be known by those skilled in the technology engine 10 usually comprises two or more cylinders, and the technique disclosed herein applies to any premixed gaseous fuel engine having one or more cylinders. Port injector 60 introduces a gaseous fuel upstream of intake valve 80, and in the illustrated embodiment into intake port 70, and in other embodiments the gaseous fuel can be introduced further upstream such as into an intake manifold (not shown) or intake runner (not shown). In other embodiments port injector 60 can be a mixer. The port injector introduces gaseous fuel during the intake stroke and/or in the compression stroke before the intake valve closes. Pilot fuel injector 90 directly introduces a pilot fuel into combustion chamber 20 later in the compression stroke after intake valve 80 is closed. The pilot fuel ignites due to the pressure and temperature environment in combustion chamber 20, and the combustion of the pilot fuel acts as a high energy ignition source for the premixed charge in the combustion chamber. In this regard, pilot injector 90 acts as an ignition device. The quantity of pilot fuel introduced by injector 90 into combustion chamber 20 is within a range of one (1) to forty (40) percent of total fuel energy introduced into the combustion chamber, and preferably within a range of one (1) to twenty (20) percent, and most preferably within a range of one (1) to ten (10) percent, on an energy basis. The premixed charge and the pilot fuel is an air-fuel mixture having a stoichiometric global air-fuel equivalence ratio in combustion chamber 20. Exhaust products from the combustion of the pilot fuel and the premixed charge are evacuated from combustion chamber 20 through exhaust valve 100, exhaust port 110, and (typically) through an after-treatment system (not shown) to maintain emission levels within predetermined limits.

Dilutant injector 120 introduces a diluting agent directly into the combustion chamber that forms stratified charge 130 around pilot injector 90, and in the illustrated embodiment is configured as a side-mount injector through cylinder block 30. The diluting agent is a gaseous fluid and can include one or more oxidizing agents, such as oxygen, one or more non-reactive substances, such as carbon dioxide or nitrogen, or a mixture of both such as air. The ignitability of the pilot fuel is improved when it is co-located with stratified charge 130. Dilutant injector 120 is actuated to introduce the diluting agent that forms stratified charge 130 when the engine load and speed are below a predetermined engine load and speed range, when the local air-fuel equivalence ratio around ignition device 90 decreases below a predetermined value when pilot fuel is introduced in the combustion chamber. When engine load and speed are below the predetermined engine load and speed range, the temperature in combustion chamber 20 around the time of the ignition event is reduced, and without dilutant injector 120 the ignitability of the pilot fuel is reduced as a result. Preferably the timing of pilot fuel injection and dilutant injection is such that pilot fuel jets and dilutant jets collide with sufficient kinetic energy to enhance mixing and to increase the reactivity of the pilot fuel particles for ignition. When the diluting agent includes oxygen, the likelihood of pilot fuel reacting with the oxygen is increased since stratified charge 130 increases the local air-fuel equivalence ratio around pilot injector 90. When the diluting agent includes non-reactive substances, the kinetic energy of the dilutant particles is imparted to pilot fuel particles during collisions, which increases the likelihood of pilot fuel particles reacting with oxygen particles (that is, it improves mixing and reactivity). When the dilutant is non-reactive then there is no adjustment in the global equivalence ratio by dilutant injector 120. When the dilutant includes an oxidizing agent then the global air-fuel equivalence ratio increases. However, since the quantity of pilot fuel introduced is typically less compared to gaseous fuel, the global air-fuel equivalence ratio does not change significantly and remains substantially stoichiometric, generally. Air handling apparatus, such as a throttle 150, can be employed to adjust the quantity of air that enters combustion chamber 20 to maintain the global equivalence ratio within a predetermined range of the stoichiometric ratio.

Electronic controller 140 is operatively connected with injectors 60, 90 and 120 to command respective injections of gaseous fuel, pilot fuel and dilutant. In the embodiments herein electronic controller 140 comprises a processor and memories, including one or more permanent memories, such as FLASH, EEPROM and a hard disk, and a temporary memory, such as SRAM and DRAM, for storing and executing a program. In other embodiments, electronic controller 140 can comprise an application specific integrated circuit (ASIC), an electronic circuit, a processor (shared, dedicated, or group) and memory that execute one or more software or firmware programs, a combinational logic circuit, and/or other suitable components that provide the functionality described herein.

Figure 2:
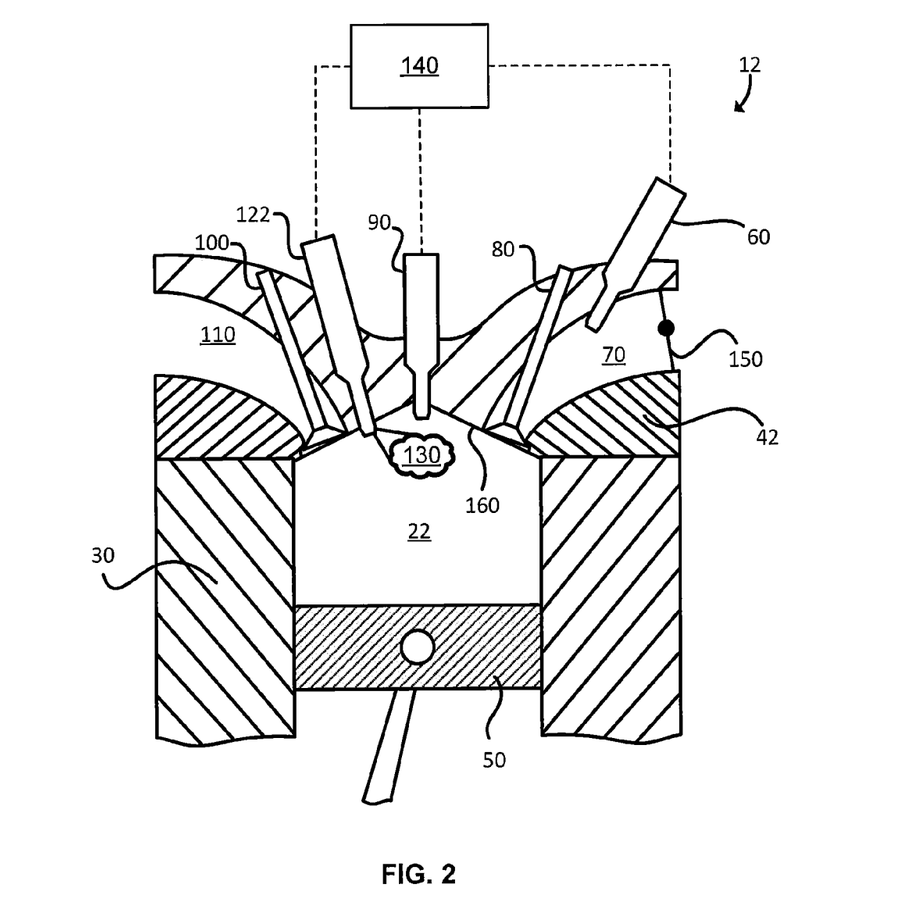
FIG. 2 is a schematic view of an ignition apparatus for a premixed gaseous fuel internal combustion engine according to a second embodiment.

Referring now to FIG. 2, a second embodiment of an ignition apparatus is illustrated including internal combustion engine 12 where like parts to the previous and all other embodiments have like reference numerals and may not be described in detail if at all. Engine 12 is also a premixed gaseous fuel engine operating with a global stoichiometric air-fuel ratio. Combustion chamber 22 comprises pent roof 160 in cylinder head 42 in which is arranged dilutant injector 122 and pilot fuel injector 60. Pent roof 160 increases the portion of the combustion chamber that is within cylinder head 42, and consequently increases the available surface area in the cylinder head into which fuel injectors can be arranged.

Figure 3:
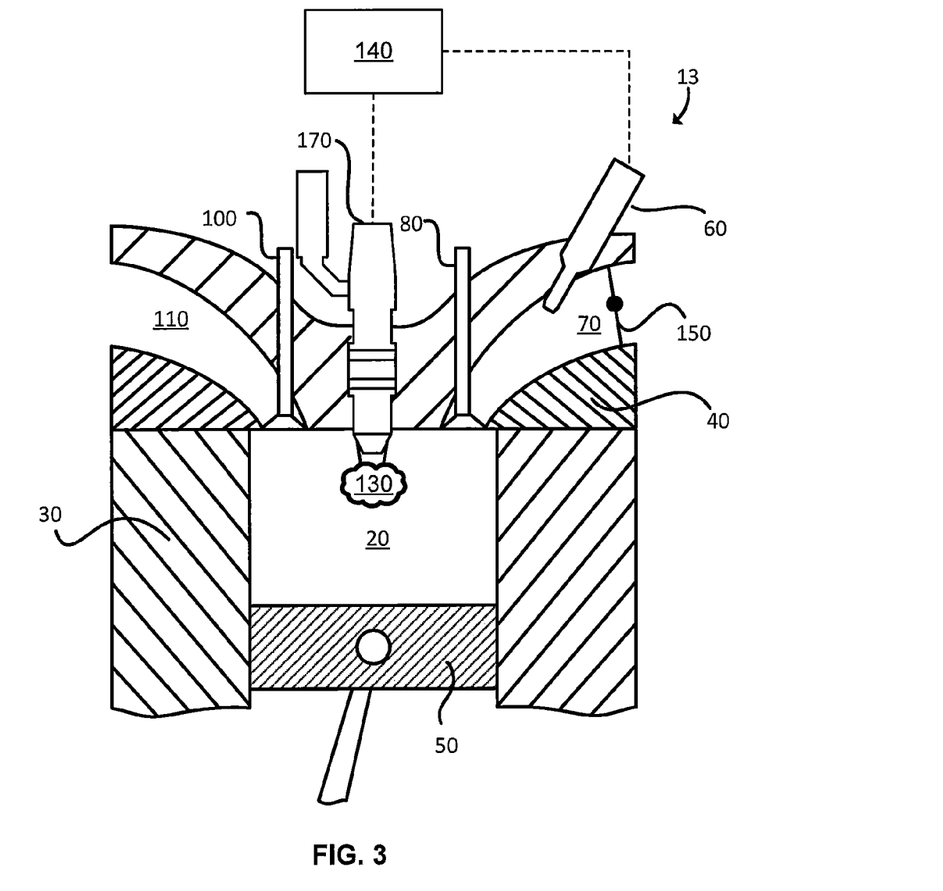
FIG. 3 is a schematic view of an ignition apparatus for a premixed gaseous fuel internal combustion engine according to a third embodiment.

Referring now to FIG. 3, a third embodiment of an ignition apparatus is illustrated including internal combustion engine 13. Engine 13 is also a premixed gaseous fuel engine operating with a global stoichiometric air-fuel ratio. Pilot and dilutant injector 170 combines a pilot fuel injector (or injection valve), and a dilutant injector (or injection valve), into a common injector body. Injector 170 can introduce pilot fuel and dilutant separately and independently from each other. Injector 170 can be a concentric needle-type injector, similar to that disclosed in co-owned U.S. Pat. No. 6,336,598, issued to Touchette et al. on Jan. 8, 2002; or it can be of a side-by-side type injector where two injection valves are arranged side-by-side in a common injector body. Alternatively, a pilot fuel injector and a dilutant injector can be packaged in a common injector body.

Figure 4:
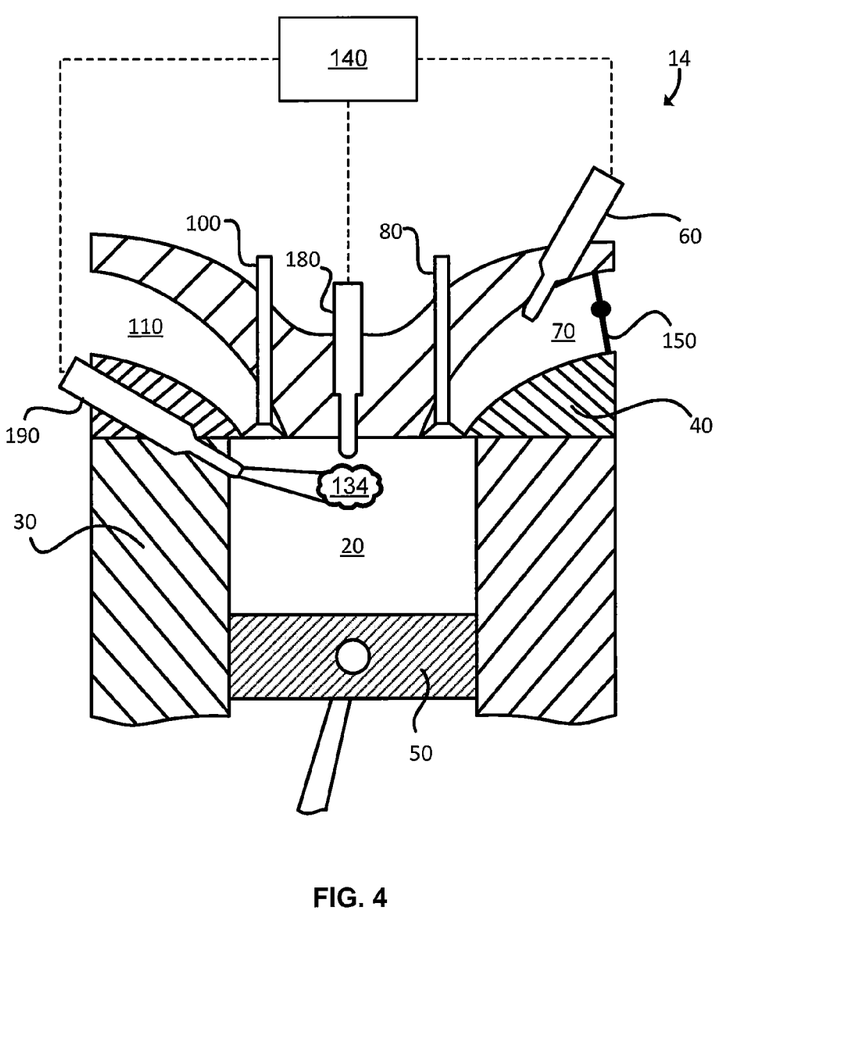
FIG. 4 is a schematic view of an ignition apparatus for a premixed gaseous fuel internal combustion engine according to a fourth embodiment.

Referring now to FIG. 4, a fourth embodiment of an ignition apparatus is illustrated including internal combustion engine 14. Engine 14 is also a premixed gaseous fuel engine operating with a global stoichiometric air-fuel ratio. Ignition device 180 is employed to ignite the premixed charge in combustion chamber 20 instead of employing a pilot fuel as in the previous embodiments. Ignition device 180 can be one of a hot surface ignition device, a spark ignition device (for example a spark plug), a microwave ignition device, a laser ignition device, a plasma ignition device, a high frequency ignition device, a corona ignition device, but other ignitions devices that do not affect the local air-fuel equivalence ratio prior to the ignition of fuel can also be employed. Hot surface ignition devices are not preferred since the ignition timing may not be sufficiently predictable in a premixed engine. Enrichment injector 190 introduces gaseous fuel that forms stratified charge 134 around ignition device 180 in combustion chamber 20, which improves the ignitability of the premixed charge in the combustion chamber. As the load and/or speed of engine 14 are decreased the throttle 150 is actuated to decrease the mass flow rate of air into combustion chamber 20 and the quantity of fuel introduced by gaseous fuel injector 60 is also decreased to maintain the stoichiometric mixture ratio. At some point below a predetermined engine load and speed range, correlating to a predetermined throttle level, ignition of the premixed charge becomes problematic. Enrichment injector 190 is actuated below the predetermined engine load and speed range to introduce the gaseous fuel that forms stratified charge 134 of gaseous fuel around ignition device 180 to decrease the local air-fuel equivalence ratio to improve the ignitability around the ignition device to increase the likelihood of flame kernel formation such that premixed combustion can commence. Alternatively, below the predetermined engine load and speed range, gaseous fuel can be introduced exclusively through enrichment injector 190 and not through gaseous fuel injector 60, such that there is only stratified charge 134 of gaseous fuel in combustion chamber 20 (there is no premixed charge), and the gaseous fuel burns in a diffusion combustion mode instead of a premixed combustion mode. In other embodiments, enrichment injector 190 can be employed to introduce gaseous fuel (during the intake stroke and early in the compression stroke) to form the premixed charge in combustion chamber 20, in addition to introducing gaseous fuel later in the compression stroke to form stratified charge 134. In such embodiments gaseous fuel injector 60 is not required. In still further embodiments, engine 14 can operate with a globally lean air-fuel equivalence ratio, where throttle 150 may not be present. In such embodiments, as the engine load and speed decrease the lean limit is reached where the air-fuel mixture in combustion chamber 20 is too lean to burn. Enrichment injector 190 can be actuated to decrease the local air-fuel equivalence ratio around ignition device 180, and the actuation of gaseous fuel injector can be adjusted to maintain the global air-fuel equivalence ratio, such that the lean limit of the engine can be increased. Hot surface ignition devices can be employed in those embodiments where only a stratified air-fuel charge is employed in combustion chamber 20, and such engines can operate either with a globally lean or stoichiometric air-fuel equivalence ratio. In other embodiments, enrichment injector 190 can be an enrichment and dilutant injector that can separately and independently introduce gaseous fuel and a diluting agent into combustion chamber 20, similar to injector 170 in FIG. 3. The dilutant and the gaseous fuel can be introduced below the predetermined threshold engine load and speed range to improve the ignitability around ignition device 180.

Figure 5:
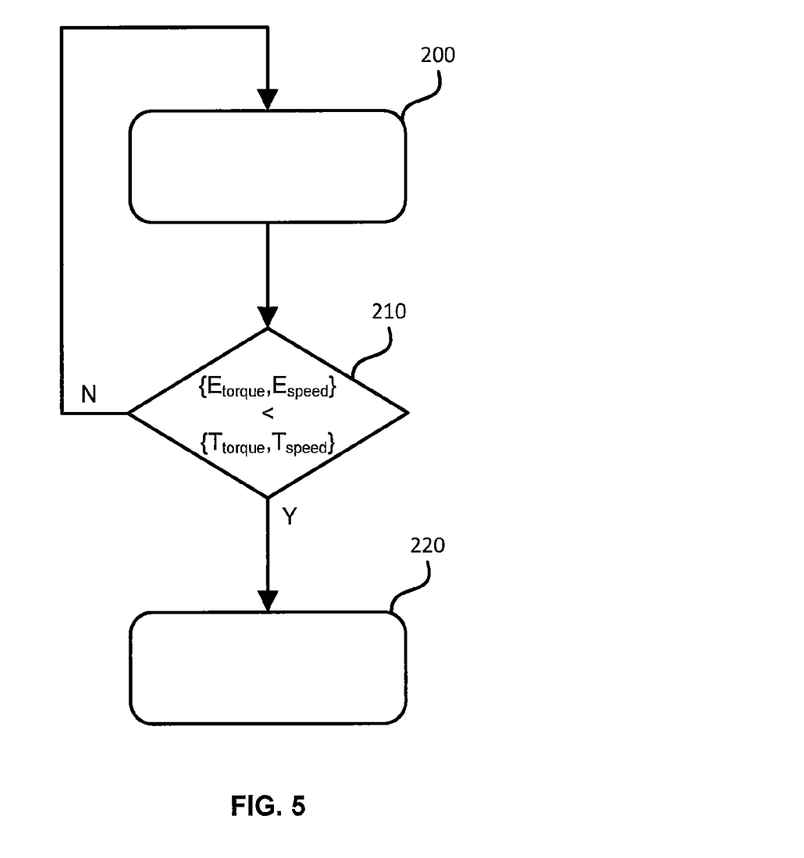
FIG. 5 is a flowchart view of a method of igniting a premixed charge in a gaseous fuel internal combustion engine.

Referring now to FIG. 5, a method of igniting the premixed charge in engines 10, 12, 13 and 14 is now described. Engine load and engine speed are monitored in step 200, and are compared with a predetermined threshold engine load and speed range in step 210. When engine load and engine speed are below the predetermined threshold engine load and speed range, dependent upon the type of ignition device, at least one of a dilutant injector and an enrichment injector are actuated in step 220. The predetermined threshold engine load and speed range is at least a function of the ambient temperature, because the reactivity of the premixed charge is a function of its temperature, which is directly related to the temperature of air. The dilutant injector introduces a diluting agent that forms a stratified charge around a pilot fuel ignition device. The enrichment injector introduces gaseous fuel that forms a stratified charge around an ignition device in a manner that adjusts the local air-fuel equivalence ratio to improve ignitability. Typically only one ignition device is employed in internal combustion engines, and depending upon the nature of the ignition device either a diluting agent is introduced or gaseous fuel is introduced (forming respective stratified charges around the ignition device) to improve the ignitability of the premixed charge.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An ignition apparatus in a gaseous fueled internal combustion engine comprising:
   an ignition device associated with a combustion chamber of the internal combustion engine, the combustion chamber including a piston, the ignition device is chosen from one of the following of a pilot fuel injector, a spark ignition device, a microwave ignition device, a laser ignition device, a plasma ignition device, a high frequency ignition device and a corona ignition device;
   at least one injector chosen from a dilutant injector for directly introducing a diluting agent into the combustion chamber forming a stratified charge around the ignition device and an enrichment injector for directly introducing gaseous fuel into the combustion chamber forming a stratified charge around the ignition device; and
   an electronic controller operatively connected with the ignition device and the at least one injector and programed to:
      when the at least one injector is a dilutant injector, actuate the dilutant injector to introduce the diluting agent when the ignition device decreases a local air-fuel equivalence ratio around the ignition device below a predetermined threshold; or
      when the at least one injector is an enrichment injector, actuate the enrichment injector to introduce the gaseous fuel to decrease the local air-fuel equivalence ratio when engine load and engine speed are below a predetermined threshold engine load and speed range and when the ignition device does not affect the local air-fuel equivalence around the ignition device;
   wherein the ignition apparatus, in operation, ignites a premixed charge in the combustion chamber of the gaseous fueled internal combustion engine.

2. The ignition apparatus of claim 1, wherein the gaseous fueled internal combustion engine operates with a global stoichiometric air-fuel equivalence ratio.

3. The ignition apparatus of claim 1, wherein the pilot fuel injector is configured to directly introduce a pilot fuel into the combustion chamber.

4. The ignition apparatus of claim 1, wherein the diluting agent comprises at least one of an oxidizing agent and a non-reactive substance.

5. The ignition apparatus of claim 1, wherein the diluting agent increases the local air-fuel equivalence ratio around the ignition device.

6. The ignition apparatus of claim 1, wherein the diluting agent is air.

7. The ignition apparatus of claim 1, wherein the dilutant injector is part of a dilutant and pilot fuel injector.

8. The ignition apparatus of claim 1, wherein the electronic controller is further programmed to actuate the enrichment injector to inject all the gaseous fuel that is burned in the combustion chamber.

9. The ignition apparatus of claim 8, wherein the electronic controller is further programmed to actuate the enrichment injector to inject at least a portion of the gaseous fuel to form the premixed charge.

10. The ignition apparatus of claim 1, wherein the enrichment injector is part of an enrichment and dilutant injector.

11. The ignition apparatus of claim 1, wherein the gaseous fuel is at least one of hydrogen, methane, natural gas and propane.

12. The ignition apparatus of claim 1, wherein
   when the at least one injector is the dilutant injector, the dilutant injector is actuated when a temperature in the combustion chamber is below a predetermined threshold when the ignition device is actuated, or
   when the at least one injector is the enrichment injector, the enrichment injector is actuated when a temperature in the combustion chamber is below a predetermined threshold when the ignition device is actuated.

13. A method for igniting a premixed charge in a gaseous fueled internal combustion engine comprising:
   monitoring engine load and engine speed;
   when engine load and engine speed are below a predetermined threshold engine load and speed range:
      diluting the premixed charge near to an ignition device by actuating a dilutant injector to inject a diluting agent directly into a combustion chamber forming a stratified charge around the ignition device when the local air-fuel equivalence ratio around the ignition device decreases below a predetermined threshold prior to ignition; or
      enriching the premixed charge near the ignition device by actuating an enrichment injector to inject gaseous fuel directly into the combustion chamber forming a stratified charge around the ignition device to decrease the local air-fuel equivalence ratio when the local air-fuel equivalence ratio remains substantially stoichiometric around the ignition device prior to ignition.

14. The method of claim 13, further comprising monitoring a temperature in the combustion chamber and performing the steps of diluting and enriching when the temperature in the combustion chamber is below a predetermined value.

15. The method of claim 13, further comprising burning all the gaseous fuel in the combustion chamber in a diffusion combustion mode when the engine load and engine speed are below the predetermined threshold engine load and speed range.

16. The method of claim 13, wherein the premixed charge is simultaneously diluted and enriched around the ignition device to improve the ignitability of the premixed charge.

17. The method of claim 13, further comprising forming the premixed charge in the combustion chamber before forming the stratified charge.

18. The method of claim 13, wherein the stratified charge is distinct from the premixed charge.

19. The ignition apparatus of claim 1, further comprising:
   an intake port coupled to the combustion chamber;
   an intake valve configured to open and close the intake port; and
   a port injector within the intake port and configured to introduce a gaseous fuel upstream the intake valve.

20. The ignition apparatus of claim 1, wherein the stratified charge is distinct from the premixed charge.

* * * * *